US008002870B2

(12) United States Patent
Yamashita

(10) Patent No.: US 8,002,870 B2
(45) Date of Patent: Aug. 23, 2011

(54) AGRICULTURAL COMPOSITIONS AND METHODS FOR MAKING AND USING THE SAME

(76) Inventor: Thomas T. Yamashita, Turlock, CA (US)

( * ) Notice: Subject to any disclaimer, the term of this patent is extended or adjusted under 35 U.S.C. 154(b) by 387 days.

(21) Appl. No.: 12/238,348

(22) Filed: Sep. 25, 2008

(65) Prior Publication Data

US 2009/0078014 A1 Mar. 26, 2009

Related U.S. Application Data

(60) Provisional application No. 60/975,064, filed on Sep. 25, 2007.

(51) Int. Cl.
*C05D 9/02* (2006.01)
*C05F 11/10* (2006.01)

(52) U.S. Cl. ............ 71/11; 71/31; 71/64.01; 405/128.5; 504/101; 504/113; 504/119; 504/120; 504/121; 504/122; 504/123; 588/400

(58) Field of Classification Search ................ 71/11–26, 71/31, 64.01; 504/101, 113, 119, 120, 121, 504/122, 123
See application file for complete search history.

(56) References Cited

U.S. PATENT DOCUMENTS

| | | | |
|---|---|---|---|
| 4,229,442 A * | 10/1980 | Pinckard | 424/725 |
| 5,549,729 A | 8/1996 | Yamashita | |
| 5,582,627 A | 12/1996 | Yamashita | |
| 5,696,094 A | 12/1997 | Yamashita | |
| 5,797,976 A | 8/1998 | Yamashita | |
| 6,165,245 A | 12/2000 | Yamashita | |
| 6,187,326 B1 | 2/2001 | Yamashita | |
| 6,241,795 B1 * | 6/2001 | Svec et al. | 71/11 |
| 6,309,440 B1 | 10/2001 | Yamashita | |
| 6,318,023 B1 | 11/2001 | Yamashita | |
| 6,336,772 B1 | 1/2002 | Yamashita | |
| 6,383,245 B1 | 5/2002 | Yamashita | |
| 6,475,258 B1 | 11/2002 | Yamashita | |
| 6,524,600 B2 | 2/2003 | Yamashita | |
| 6,871,446 B1 | 3/2005 | Yamashita | |
| 6,874,277 B2 | 4/2005 | Yamashita | |
| 6,953,585 B2 | 10/2005 | Yamashita | |
| 7,261,902 B2 | 8/2007 | Yamashita | |
| 7,501,006 B2 * | 3/2009 | Rogers et al. | 71/25 |
| 2005/0158355 A1 | 7/2005 | Yamashita | |
| 2005/0197252 A1 | 9/2005 | Yamashita | |
| 2006/0083725 A1 | 4/2006 | Dean | |

* cited by examiner

*Primary Examiner* — Wayne Langel
(74) *Attorney, Agent, or Firm* — Bozicevic, Field & Francis LLP; Bret E. Field; Glenn J. Foulds

(57) ABSTRACT

Soil amendment/foliar nutrient compositions and methods for their manufacture and use are provided. The compositions are aqueous compositions that include a carbon skeleton energy component (CSE); a macronutrient; a vitamin cofactor; a complexing agent; and at least one of exotic micronutrient component and an ionophore component.

20 Claims, No Drawings

AGRICULTURAL COMPOSITIONS AND METHODS FOR MAKING AND USING THE SAME

CROSS-REFERENCE TO RELATED APPLICATIONS

Pursuant to 35 U.S.C. §119 (e), this application claims priority to the filing date of U.S. Provisional Patent Application Ser. No. 60/975,064 filed on Sep. 25, 2007; the disclosure of which application is herein incorporated by reference.

INTRODUCTION

Fertilizers are materials that are used to supply elements needed for plant nutrition. Fertilizer materials may be in the form of solids, semi-solids, slurry suspensions, pure liquids, aqueous solutions and gases. Fertilizing materials may be introduced into a plant's environment in a number of different ways, including through addition to the soil, through application directly to a plant's foliage, and the like. The use of fertilizers is critical to commercial agriculture as fertilizers are essential to correct natural deficiencies and/or replace components in soil.

Despite the number of different foliar fertilizers that have been developed, there is a continued need to develop new compositions.

SUMMARY

Soil amendment/foliar nutrient compositions and methods for their manufacture and use are provided. The compositions are aqueous compositions that include a carbon skeleton energy component (CSE); a macronutrient; a vitamin cofactor; a complexing agent; and at least one of an exotic micronutrient component and an ionophore.

DETAILED DESCRIPTION

Soil amendment/foliar nutrient compositions and methods for their manufacture and use are provided. The compositions are aqueous compositions that include a carbon skeleton energy component (CSE); a macronutrient; a vitamin cofactor; a complexing agent; and at least one of an exotic micronutrient component and an ionophore.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

In further describing various aspects of the invention, embodiments of the compositions and methods for their production are reviewed described first in greater detail. Next, methods of using compositions of the invention as well as various applications in which the compositions and methods find use are reviewed.

Compositions

As summarized above, the compositions are aqueous compositions that include a carbon skeleton energy component (CSE); a macronutrient; a vitamin cofactor; a complexing agent; and at least one of an exotic micronutrient component and an ionophore. Each of these different components of the compositions is now reviewed in greater detail. The compositions reviewed below are described in terms of a "concentrated product." As is known in the art, during use the concentrated product may be diluted as desired, prior to application to soil and/or foliage, as described in greater detail below.

CSE Component

CSE components that find use in the subject compositions are carbon containing substances which provide a readily assimilable source of both carbon and energy for promoting microbial proliferation. In certain embodiments, the CSE component provides a complex array of various carbon compounds such that varied enzymology is induced in microbes present in the target soil. As such, CSE sources that favor ancestral, beneficial species, which normally carry complex enzyme systems (as opposed to more simplified forms hosted by facultative pathogens) are of interest in certain embodiments. The carbon skeleton energy component is a $C_2$ to $C_{10}$, such as $C_4$ to $C_8$ compound or polymer thereof, e.g., a polymer in which the monomeric units are $C_2$ to $C_{10}$ compounds, such as a polysaccharide. The CSE component may be a single carbon containing compound or a composition of two or more different carbon containing or organic compounds. Compounds and compositions capable of serving as a CSE component include: complex organic compositions, such as molasses (e.g. cane, sugar beet, sorghum, etc.), whey, corn steep liquor, grape syrup, maple syrup, corn syrup, etc; sugars, e.g. sucrose, fructose, glucose, lactose, galactose, dextrose, maltose, raffinose, ribose, ribulose, xylulose, xylose, amylose, arabinose, etc.; sugar phosphates, e.g. fucose-P, galactose-P, glucose-P, lactose-P, maltose-P, mannose-P, ribose-P, ribulose-P, xylose-P, xylulose-P, etc.; sugar alcohols, e.g. adonitol, sorbitol, mannitol, maltitol, ribitol, galactitol, glucitol, etc.; organic acids, e.g. gluccuronic acid, alpha ketoglutaric acid, galactonic acid, glucaric acid, gluconic acid, pyruvic acid, polygalacturonic acid, citric acid, succinic acid, malic acid, isocitric acid, folic acid, etc.; nucleotides and bases, e.g. adenosine, adenosine-P, uridine, uridine-P, thymine, thymine-P, cytosine, cytosine-P, guanine, guanine-P, etc.; and amino acids, e.g. glycine, alanine, leucine, isoleucine, asparagine, tyrosine, phenylalanine, serine, cysteine, valine, proline, methionine, glutamine, threonine, lysine, aspartic acid, glutamic acid, arginine, and the like.

In one embodiment, the CSE source is a molasses. Molasses may be obtained from a number of commercial sources, including cane molasses, etc., where commercial sources of molasses include: Westway Terminal, Stockton Calif.; PM Ag, Stockton, Calif.; and the like.

In certain embodiments, the amount of CSE component in the composition ranges from about 5 to 75% w/w, such as from about 10 to 50% w/w and including from about 15 to 60% w/w.

Macronutrient Component

As noted above, the compositions include one or more macronutrient components. As the macronutrient components are components that are used by a plant, they are typically water soluble components so as to be in a form that may be easily used by a plant. The subject compositions may include one or a plurality of macronutrient components. Accordingly, the number of macronutrient components present in a composition may range from 1 to 15 or more, e.g., from 1 to 6, e.g., from 2 to 6.

The total amount of macronutrient component present in a given composition (whether one or a plurality of macronutrients) depends on a variety of factors such as the particular plant to which the composition is to be administered, the particular macronutrient component(s) employed, and the like. In many embodiments, the total amount of macronutrient component in the composition may range from about 0.01% to about 25% w/w, e.g., from about 1% to about 20% w/w, e.g., from about 1 to about 15% w/w. Exemplary macronutrient components include, but are not limited to one or more of: N, P, K, Ca, Mg, S, Cl, Na, C, H, O. For example, certain embodiments may include one or more of the following exemplary macronutrient components R—ammonium nitrate, monoammonium phosphate, ammonium phosphate sulfate, ammonium sulfates, ammonium phosphatenitrate, diammonium phosphate, ammoniated single superphosphate, ammoniated triple superphosphate, nitric phosphates, ammonium chloride, aqua ammonia, ammonia-ammonium nitrate solutions, calcium ammonium nitrate, calcium nitrate, calcium cyanamide, sodium nitrate, urea, urea-formaldehyde, urea-ammonium nitrate solution, nitrate of soda potash, potassium nitrate, amino acids, proteins, nucleic acids P—superphosphate (single, double and/or triple), phosphoric acid, ammonium phosphate, ammonium phosphate sulfate, ammonium phosphate nitrate, diammonium phosphate, ammoniated single superphosphate, ammoniated single superphosphate, ammoniated triple superphosphate, nitric phosphates, potassium pyrophosphates, sodium pyrophosphate, nucleic acid phosphates K—potassium chloride, potassium sulfate, potassium gluconate, sulfate of potash magnesia, potassium carbonate, potassium acetate, potassium citrate, potassium hydroxide, potassium manganate, potassium phosphate, potassium molybdate, potassium thiosulfate, potassium zinc sulfate Ca—calcium ammonium nitrate, calcium nitrate, calcium cyanamide, calcium acetate, calcium acetylsalicylate, calcium borate, calcium borogluconate, calcium carbonate, calcium chloride, calcium citrate, calcium ferrous citrate, calcium glycerophosphate, calcium lactate, calcium oxide, calcium pantothenate, calcium proprionate, calcium saccharate, calcium sulfate, calcium tartrate Mg—magnesium oxide, dolomite, magnesium acetate, magnesium bensoate, magnesium bisulfate, magnesium borate, magnesium chloride, magnesium citrate, magnesium nitrate, magnesium phosphate, magnesium salicylate, magnesium sulfate S—ammonium sulfate, ammonium phosphate sulfate, calcium sulfate, potassium sulfate, magnesium sulfate, sulfuric acid, cobalt sulfate, copper sulfate, ferric sulfate, ferrous sulfate, sulfur, cysteine, methionine Micronutrients In certain embodiments, the subject compositions may also include one or more micronutrient components for plant nutrition and growth. As the micronutrient components are components that are used by a plant, they are typically water soluble components so as to be in a form that may be easily used by a plant. The subject compositions may include one or a plurality of micronutrient components. Accordingly, the number of micronutrient components present in a composition may range from about 1 to about 60 or more, e.g., from about 3 to about 55, e.g., from about 4 to about 50.

The total amount of micronutrient component present in a given composition (whether one or a plurality of micronutrients) depends on a variety of factors such as the particular plant to which the composition is to be administered, the particular micronutrient component(s) employed, and the like. In many embodiments, the total amount of micronutrient component in the composition may range from about 0.001% to about 25% w/w, e.g., from about 0.01% to about 20% w/w, e.g., from about 0.01 to about 15% w/w. Exemplary micronutrient components include, but are not limited to:

Zn—zinc oxide, zinc acetate, zinc bensoate, zinc chloride, zinc citrate, zinc nitrate, zinc salicylate, ziram.

Fe—ferric chloride, ferric citrate, ferric fructose, ferric glycerophosphate, ferric nitrate, ferric oxide (saccharated), ferrous chloride, ferrous citrate ferrous fumarate, ferrous gluconate, ferrous succinate.

Mn—manganese acetate, manganese chloride, manganese nitrate, manganese phosphate.

Cu—cupric acetate, cupric butyrate, cupric chlorate, cupric chloride, cupric citrate, cupric gluconate, cupric glycinate, cupric nitrate, cupric salicylate, cuprous acetate, cuprous chloride.

B—calcium borate, potassium borohydride, borax, boron trioxide, potassium borotartrate, potassium tetraborate, sodium borate, sodium borohydride, sodium tetraborate.

Mo—molybdic acid, calcium molybdate, potassium molybdate, sodium molybdate.

Co—cobaltic acetate, cobaltous acetate, cobaltous chloride, cobaltous oxalate, cobaltous potassium sulfate, cobaltous sulfate.

Vitamins and Cofactor Component

As noted above, the compositions include one or more vitamin/cofactor components. As the vitamin/cofactor components are components that are used by a plant, they are typically water soluble components so as to be in a form that may be easily used by a plant. The subject composition may include one or a plurality of vitamin/cofactor components. Accordingly, the number of vitamin/cofactor components present in a composition may range from about 1 to about 20 or more, e.g., from about 3 to about 15, e.g., from about 5 to about 12.

The total amount of vitamin/cofactor component present in a given composition (whether one or a plurality of vitamin/cofactor components) depends on a variety of factors such as the particular plant to which the composition is to be administered, the particular vitamin/cofactor component(s) employed, and the like. In many embodiments, the total amount of vitamin/cofactor component in the composition may range from about 0.001 to 10%, such as 0.01 to 5%, including 0.25 to 3.0% w/w. Exemplary vitamin/cofactor components include, but are not limited to:

Thiamine—thiamine pyrophosphate, thiamine monophosphate, thiamine disulfide, thiamine mononitrate, thiamine phosphoric acid ester chloride, thiamine phosphoric acid ester phosphate salt, thiamine 1,5 salt, thiamine triphosphoric acid ester, thiamine triphosphoric acid salt, yeast, yeast extract.

Riboflavin—riboflavin acetyl phosphate, flavin adenine dinucleotide, flavin adenine mononucleotide, riboflavin phosphate, yeast, yeast extract.

Nicotinic acid—nicotinic acid adenine dinucleotide, nicotinic acid amide, nicotinic acid benzyl ester, nicotinic acid monoethanolamine salt, yeast, yeast extract, nicotinic acid hydrazide, nicotinic acid hydroxamate, nicotinic acid-N-(hydroxymethyl)amide, nicotinic acid methyl ester, nicotinic acid mononucleotide, nicotinic acid nitrile.

Pyridoxine—pyridoxal phosphate, yeast, yeast extract.

Folic acid—yeast, yeast extract, folinic acid.

Biotin—biotin sulfoxide, yeast, yeast extract, biotin 4-amidobenzoic acid, biotin amidocaproate N-hydroxysuccinimide ester, biotin 6-amidoquinoline, biotin hydrazide, biotin methyl ester, d-biotin-N-hydroxysuccinimide ester, biotin-maleimide, d-biotin p-nitrophenyl ester, biotin propranolal, 5-(N-biotinyl)-3 aminoallyl)-uridine 5'-triphosphate, biotinylated uridine 5'-triphosphate, N-e-biotinyl-lysine.

Pantothenic acid—yeast, yeast extract, coenzyme A.

Cyanocobalamin—yeast, yeast extract.

Phosphatidylcholine—soybean oil, eggs, bovine heart, bovine brain, bovine liver, L-a-phosphatidylcholine, B-acetyl-g-O-alkyl, D-a-phosphatidylcholine(PTCn), B-acetyl-g-O-hexadecyl, DL-a-PTCh, B-acetyl-g-O-hexadecyl, L-a-PTCh, B-acetyl-g-O-(octadec-9-cis-e-nyl), L-a-PTCh, B-arachidonoyl, g-stearoyl, L-a-PTCh, diarachidoyl, L-a-PTCh, dibehenoyl(dibutyroyl, dicaproyl, dicapryloyl, didecanoyl, dielaidoyl, 12 diheptadecanoyl, diheptanoyl), DL-a-PTCh dilauroyl, La-PTCh dimyristoyl(dilauroyl, dilinoleoyl, dinonanoyl, dioleoyl, dipentadeconoyl, dipalmitoyl, distearoyl, diundecanoyl, divaleroyl, B-elaidoyl-a-palmitoyl, B-linoleoyl-a-palmitoyl)DL-a-PTCh di-O-hexadecyl(dioleoyl, dipalmitoyl, B—O-methyl-g-O-hexadecyl, B-oleoyl-g-O-hexadecyl, B-palmitoyl-g-O-hexadecyl), D-a-PTCh dipalmitoyl, L-a-PTCh, B—O-methyl-g-O-octadecyl, L-a-PTCh, B—(NBD-aminohexanoyl)-g-pal-mitoyl, L-a-PTCh, B-oleoyl-g-O-palmitoyl(stearoyl), L-a-PTCh, B-palmitoyl-g-oleoyl, L-a-PTCh, B-palmitoyl-a-(pyren 1-yl)hexanoyl, L-a-PTCh, B(pyren-1-yl)-decanoyl-g-palmitoyl, L-a-PTCh, B-(pyren-1-yl) -hexanoyl-g-palmitoyl, L-a-PTCh, B-stearoyl-g-oleoyl.

Inositol—inositol monophosphate, inositol macinate, myo-inositol, epi-inositol, myo-inositol 2,2'anhydro-2-c-hydroxymethyl(2-c-methylene-my-oinositol oxide), D-myo-inositol 1,4-bisphosphate, DL-myo-inositol 1,2-cyclic monophosphate, myo-inositol dehydrogenase, myo-inositol hexanicotinate, inositol hexaphosphate, myo-inositol hexasulfate, myo-inositol 2-monophosphate, D-myo-inositol 1-monophosphate, DL -myo-inositol 1-monophosphate, D-Myo-inositol triphosphate, scyllo-inositol.

PABA—m-aminobenzoic acid, O-aminobenzoic acid, p-aminobenzoic acid butyl ester, PABA ethyl ester, 3-ABA ethyl ester.

Complexing Agents

As noted above, the compositions may also include one or more complexing agents. A complexing agent is an agent that aids in the solubilization of other components in the composition which otherwise may precipitate and become non-assimilable or difficultly assimilable. For example, a complexing agent such as citric acid, humic acids, lignosulfonate, etc. may serve to tie up ions such as iron and other ions and prevent them from forming precipitates such that a complexing agent may be an agent that is capable of complexing with a metal ion. In some cases, e.g. with EDTA, this complexing is by way of a process of chelation. The component, e.g., macronutrient or micronutrient, so complexed nevertheless remains assimilable. As such, complexing agents may be described as agents which act to facilitate transfer of other components into the cell structure of a plants. As the complexing agents are used by a plant, they are typically water soluble agents so as to be in a form that may be easily used by a plant.

The subject composition may include one or a plurality of complexing agents. Accordingly, the number of complexing agents present in a composition may range from about 1 to about 35 or more, e.g., from about 1 to about 20, e.g., from about 1 to about 10.

The total amount of complexing agent present in a given composition (whether one or a plurality of complexing agents) depends on a variety of factors such as the particular plant to which the composition is to be administered, the particular complexing agent(s) employed, and the like. In certain embodiments, the total amount of complexing agent in the composition may range from about 0.01% to about 30% w/w, e.g., from about 0.1% to about 25% w/w, e.g., from about 1.0% to about 20% w/w. Exemplary complexing agents include, but are not limited to, include, but are not limited to: citric acid, lignosulfonates, e.g., Ca—, K—, Na—, and ammonium lignosulfonates, amino acids, nucleic acids, ethylenediamin tetraacetatic acid (EDTA), diethylene triamine pentacetic acid (DTPA), nitrolotriacetic acid (NTA), ethylenediaminediacetate (EDDA), ethylenediaminedi(o-hydroxyphenylacetic) acid (EDDHA), hydroxyethylethylene-diaminetriacetic acid (HEDTA), cyclohexane diamine tetraacetic acid (CDTA), propionic acid, and the like Naturally occurring chelating agents may also be employed. By naturally occurring chelating agent is meant that the chelating agent is a chelating agent that occurs in nature, i.e. not an agent that has been first synthesized by human intervention. The naturally occurring chelating agent may be a low molecular weight chelating agent, where by low molecular weight chelating agent is meant that the molecular weight of the chelating agent does not exceed about 200 daltons. In certain embodiments, the molecular weight of the chelating agent is greater than about 100 daltons.

Naturally occurring low molecular weight chelating agents that may be used are microbial produced chelating agents, where by "microbial produced" is meant that the chelating agent is produced by a microbe, where the microbe is generally a bacterium or a fungus. In many embodiments, the chelating agents are citric acid cycle intermediates and derivatives thereof. Specific chelating agents of interest include: malic acid, succinic acid, oxalacetic acid, ketoglutaric acid and citric acid and amino acids derived from citric acid cycle intermediates, such as glycine (75.1 daltons), alanine (89.1 daltons), serine (105.1 daltons), valine (117.2 daltons), threonine (119.1 daltons), cysteine (121.2 daltons), leucine (131.2 daltons), isoleucine (131.2 daltons), aspariginine (132.1 daltons), glutamine (146.2 daltons), methionine (149.2 daltons), etc.

Accordingly, embodiments include compositions that may include a source of at least one naturally occurring chelating agent. By source is meant that the compositions may include the chelating agents or an entity or component that produces the chelating agents. In many embodiments, the source of chelating agents is a living or viable microbial source of chelating agents. For example, the microbial source may be a bacterial or fungal culture which produces the requisite chelating agents.

Exotic Micronutrient Component

The exotic micronutrient component of the subject compositions includes a set or collection of non-traditional micronutrients, where the non-traditional micronutrients may be ones that provide ionic elements found in low amounts, e.g., low parts per million to parts per billion range, in virgin soils (i.e., soils that have not been used previously for agriculture). Non-traditional micronutrients are micronutrients that promote the electrostatic bonding of amino acid chains. A given exotic micronutrient component may provide for 10 or more, e.g., 20 or more, 30 or more, 40 or more, 50 or more, distinct exotic micronutrient ionic elements, where in certain embodiments the component provides for 45 or more, e.g., 47, 48, 49, 50, 51 or 52, distinct ionic elements in low concentration, e.g., ppb to low ppm ranges.

Exotic micronutrient components of interest are ones that serve as a source of ionic species of at least some of the elements, e.g., 10 or more, 20 or more, 30 or more, 40 or more, 50 or more, from the following list: Aluminum (Al), Antimony (Sb), Barium (Ba), Beryllium (Be), Bismuth (Bi), Boron (B), Bromine (Br), Cadmium (Cd), Cerium (Ce), Cesium (Cs), Chromium (Cr), Cobalt (Co), Dysprosium (Dy), Erbium (Er), Europium (Eu), Fluorine (F), Gadolinium (Gd), Gallium (Ga), Germanium (Ge), Gold (Au), Hafnium (Hf), Holmium (Ho), Indium (In), Lanthanum (La), Lutetium (Lu), Lithium (Li), Mercury (Hg), Molybdenum (Mo), Neodymium (Nd), Nickel (Ni), Niobium (Nb), Platinum (Pt), Praseodymium (Pr), Rhodium (Rh), Ruthenium (Ru), Samarium (Sm), Scandium (Sc), Selenium (Se), Silica (Si), Silver (Ag), Strontium (Sr), Sulfur (S), Tellurium (Te), Terbium (Tb), Thallium (Tl), Thorium (Th), Thulium (Tm), Tin (Sn), Titanium (Ti), Tungsten (W), Vanadium (V), Ytterbium (Yb), Yttrium (Y), and Zirconium (Zr).

It is noted that sulfur is listed as a possible exotic micronutrient and yet also listed as a possible macronutrient above. In embodiments where sulfur is employed as an exotic micronutrient, it will not be present in amounts where it may function as a macronutrient. It is further noted that boron, molybdenum and cobalt are all listed as possible exotic micronutrients and yet are also listed as a possible micronutrients above. In embodiments where boron, molybdenum and cobalt are employed as exotic micronutrients, they will not be present in amounts where they may function as a micronutrients.

The exotic micronutrient components may be collections or combinations of multiple salts which provide for the desired ionic elements. Examples of sources of various of the above elements are provided in the following Table 1:

TABLE 1

| Exotic Micronutrient Element | Symb. | Source: Nitrates | Source: Chlorides | Source: Sulfides | Source: Oxides | Source: Misc. |
|---|---|---|---|---|---|---|
| Europium | Eu | $Eu(NO_3)_3$ | $EuCl_3$ | $Eu_2(SO_4)_3$ | $Eu(OH)_3$ $Eu_2O_3$ | |
| Fluorine | F | $FNO_3$ | | | $F_2O$ | $C_2H_4FNO$: Fluoroacetamide $C_2H_3FO_2$: Fluoroacetic Acid $ClFO_4$: Perchlorate |
| Gadolinium | Gd | $Gd(NO_3)_3$ | $GdCl_3$ | $Gd_2(SO_4)_3$ | $Gd(OH)_3$ $Gd_2O_3$ | |
| Gallium | Ga | $Ga(NO_3)_3$ | $GaCl_3$ | $Ga_2(SO_4)_3$ | $Ga(OH)_3$ $Ga_2O_3$ | |
| Germanium | Ge | | $Cl_2Ge$ $Cl_4Ge$ | | $GeO_2$ | $F_4Ge$: Tetrafluoride |
| Gold | Au | | $AuCl$ | $Au_2S$ | $Au_2O$ | CAuN: Monocyanide AuI: Monoiodide |
| Hafnium | Hf | | $HfCl_4$ | $Hf(SO_4)$ | $HfO_2$ | |
| Holmium | Ho | | $HoCl_3$ | | $Ho_2O_3$ | $HoB_3$: Bromide $HoI_3$: Iodide |
| Indium | In | | $Cl_3In$ | $In_2O_{12}S_3$ | $In_2O_3$ | InP: Phosphide AsIn: Arsenide |
| Lanthanum | La | $La(NO_3)_3$ | $LaCl_3$ | $La_2(SO_4)_3$ | $La(OH)_3$ $La_2O_3$ | |
| Lithium | Li | $LiNO_3$ | $ClLi$ | $Li_2O_4S$ | $HLiO$ $Li_2O$ | |

TABLE 1-continued

| Exotic Micronutrient Element | Symb. | Source: Nitrates | Source: Chlorides | Source: Sulfides | Source: Oxides | Source: Misc. |
|---|---|---|---|---|---|---|
| Lutetium | Lu | | $LuCl_3$ | $Lu_2(SO_4)_3$ | $Lu_2O_3$ | |
| Neodymium | Nd | $Nd(NO_3)_3$ | $NdCl_3$ | $Nd_2(SO_4)_3$ | $Nd(OH)_3$ $Nd_2O_3$ | |
| Nickel | Ni | $N_2NiO_6$ | $Cl_2Ni$ | $NiO_4S$ | $H_2NiO_2$ $Ni_2O_3$ | |
| Niobium | Nb | | $Cl_5Nb$ | | $Nb_2O_5$ | $F_4Nb$ Pentafluoride $F_7K_2NbO$ Oxypenafluoride |
| Platinum | Pt | na | na | na | na | |
| Praseodymium | Pr | | $PrCl_3$ | $Pr_2(SO_4)_3$ | $Pr(OH)_3$ $PrO_2$ $Pr_2O_3$ | |
| Rhodium | Rh | | $C_4Cl_2O_4Rh_2$ $Cl_3Rh$ | | | |
| Ruthenium | Ru | | $Cl_3Ru$ $Cl_6H_{42}N_{14}O_2Ru$ | | $O_4Ru$ | |
| Samarium | Sm | | $SmCl_2$ $SmCl_3$ | $Sm_2(SO_4)_3$ | $Sm(OH)_3$ $Sm_2O_3$ | |
| Scandium | Sc | $Sc(NO_3)_3$ | $ScCl_3$ | $Sc_2(SO_4)_3$ | $Sc(OH)_3$ $O_3Sc_2$ | |
| Silicon | Si | | $Cl_4Si$ | $S_2Si$: Disulfide | $OSi$ $O_2Si$ | $F_4Si$: Tetrafluoride $CSi$: Carbide $Br_4Si$: Tetrabromide |
| Silver | Ag | $AgNO_2$ $Ag(NO_3)_3$ | $AgCl$ $AgClO_4$ | $Ag_2S$ $Ag_2O_4S$ | $AgO$ $Ag_2O$ $C_2Ag_2O_4$ | $AgI$: Iodide $AgF$: Fluoride |
| Strontium | Sr | $N_2O_6Sr$ | $Cl_2Sr$ $Cl_2O_6Sr$ | $O_4SSr$ | $OSr$ $O_2Sr$ $H_2O_2Sr$ | $F_2Sr$: Floride |
| Sulfur | S | | $Cl_2S_2$ $Cl_2O_2S$ | | $O_2S$ $O_3S$ | $H_2O_4S$: Sulfuric Acid $SI$: Iodide $F_4S$: Tetrafluoride |
| Tellurium | Te | | $Cl_2Te$ $Cl_4Te$ | | $O_2Te$ | $Br_2Te$: Tetrabromide $F_6Te$: Tetrafluoride $H_2O_3Te$: Telluric Acid |
| Terbium | Tb | $Tb(NO_3)_3$ | $TbCl_3 6H_2O$ | | $O_3Tb_2$ $Tb_4O_7$ | |
| Thallium | Tl | $NO_3Tl$ | $Cl_3Tl$ | $STl_2$ $O_4STl_2$ | $HOTl$ $OTl_2$ | $C_2H_3O_2Tl$: Acetate |
| Thorium | Th | $N_4O_{12}Th$ | $Cl_4Th$ | $O_8S_2Th$ | $O_2Th$ | $I_4Th$: Iodide |
| Thulium | Tm | $Tm(NO_3)_3$ | $TmCl_3 \cdot 7H_2O$ | $Tm_2(SO_4)_3 \cdot 8H_2O$ | $Tm(OH)_3$ $O_3Tm_2$ | $Tm_2(C_2O_4)_3 \cdot 6H_2O$: C Oxalate hexahydrate |
| Tin | Sn | | | | $SnO$ | $Sn_4P_3$: Phosphides |
| Titanium | Ti | | $C_{10}H_{10}Cl_2Ti$ $Cl_2Ti$ $Cl_3Ti$ $Cl_4Ti$ | $O_5STi$ $O_{12}S_3Ti_2$ | $O_2Ti$ | $F_4Ti$: Tetrafluoride $H_2Ti$: Hydride |
| Tungsten | W | | | | $O_3W$ | $F_6W$: Hexafluoride $H_2O_4W$: Tungstic Acid |
| Vanadium | V | | $Cl_2OV$ $Cl_3OV$ | $O_5SV$ $S_3V_2$ $O_{12}S_3V_2$ | $O_3V_2$ $O_5V_2$ | $F_3V$: Trifluoride $F_4V$: Tetrafluoride $F_5V$: Pentafluoride |
| Ytterbium | Yb | $Yb(NO_3)_3$ | $YbCl_3$ | $Yb_2(SO_4)_3$ | $O_3Yb_2$ | |
| Yttrium | Y | $Y(NO_3)_3$ | $YCl_3$ | $Y_2(SO_4)_3$ | $O_3Y_2$ $Y(OH)_3$ | |
| Zirconium | Zr | $N_4O_{12}Zr$ | $Cl_4Zr$ $Cl_2OZr$ | $O_8S_2Zr$ | $O_2Zr$ $H_4O_4Zr$ | $ZrF_4$: Tetrafluoride $ZrH_2$: Hydride $I_4Zr$: Iodide |

The above list of sources of the exotic micronutrients of interest are merely representative. Any convenient source may be employed.

The overall amount of exotic micronutrient component (made up of all of the exotic micronutrients) in the concentrated product may vary. In certain embodiments, the amount ranges from 1 to 15%, such as 2 to 10%, including 2.5 to 7.5% w/w of the concentrated product.

Within a given exotic micronutrient component, the amounts of individual micronutrients are chosen to provide for concentrations of elements as desired, where the desired concentrations of elements may vary, depending on the particular nature of the exotic micronutrient. For example, one class of exotic micronutrients may be viewed as "severe" micronutrients, and includes Hg (Mercury), Cd (Cadmium), Cs (Cesium). The amounts of these micronutrients may be chosen to provide a concentration in the concentrated product ranging from 1 to 10 ppb, such as 7.5 ppb. Another class of exotic micronutrients may be viewed as "intermediate" micronutrients, and includes Se (Selenium), Al (Aluminum), Ba (Barium), Be (Beryllium), B (Boron), Cr (Chromium), Dy (Dysprosium), Ga (Gallium), La (Lanthanum), Ni (Nickel), Ru (Ruthenium), Sr (Strontium), Te (Tellurium), Sn (Tin), V (Vanadium). The amounts of these micronutrients may be chosen to provide a concentration in the concentrated product ranging from 10 to 25 ppb, such as 15 ppb. Another class of exotic micronutrients may be viewed as "Standard I" micronutrients, and includes Mo (Molybdenum), Sb (Antimony), Ce (Cerium), Co (Cobalt), Er (Erbium), Gd (Gadolinium), Ge (Germanium), Hf (Hafnium), Lu (Lutetium), Li (Lithium), Rh (Rhodium), Sm (Samarium), Ti (Titanium), W (Tungsten), Yb (Ytterbium), Zr (Zirconium). The amounts of these micronutrients may be chosen to provide a concentration in the concentrated product ranging from 20 to 40 ppb, such as 35 ppb. Another class of exotic micronutrients may be viewed as "Standard II" micronutrients, and includes Bi (Bismuth), Eu (Europium), Ho (Holmium), Nd (Neodymium), Pt (Platinum), Ag (Silver), Tl (Thallium), Th (Thorium). The amounts of these micronutrients may be chosen to provide a concentration in the concentrated product ranging from 95 to 150 ppb, such as 90 ppb. Another class of exotic micronutrients may be viewed as "Standard III" micronutrients, and includes Br (Bromine), F (Fluorine), Au (Gold), In (Indium), Pr (Praseodymium), Tb (Terbium), Tm (Thulium). The amounts of these micronutrients may be chosen to provide a concentration in the concentrated product ranging from 400 to 1,000 ppb, such as 850 ppb. Another class of exotic micronutrients may be viewed as "Standard IV" micronutrients, and includes Nb (Niobium), Sc (Scandium), Si (Silicon), S (Sulfur), Y (Yttrium). The amounts of these micronutrients may be chosen to provide a concentration in the concentrated product ranging from 2,000 to 3,700 ppb, such as 3,200 ppb.

An embodiment of the an exotic micronutrient component of interest is one that provides ionic species of the following elements in the amounts provided below: (1) Hg (Mercury), Cd (Cadmium), and Cs (Cesium) ranging from 1 to 10 ppb, such as 7.5 ppb; (2) Se (Selenium), Al (Aluminum), Ba (Barium), Be (Beryllium), B (Boron), Cr (Chromium), Dy (Dysprosium), Ga (Gallium), La (Lanthanum), Ni (Nickel), Ru (Ruthenium), Sr (Strontium), Te (Tellurium), Sn (Tin), V (Vanadium) ranging from 10 to 25 ppb, such as 15 ppb; (3) Mo (Molybdenum), Sb (Antimony), Ce (Cerium), Co (Cobalt), Er (Erbium), Gd (Gadolinium), Ge (Germanium), Hf (Hafnium), Lu (Lutetium), Li (Lithium), Rh (Rhodium), Sm (Samarium), Ti (Titanium), W (Tungsten), Yb (Ytterbium), Zr (Zirconium) ranging from 20 to 40 ppb, such as 35 ppb; (4) Bi (Bismuth), Eu (Europium), Ho (Holmium), Nd (Neodymium), Pt (Platinum), Ag (Silver), Tl (Thallium), Th (Thorium) ranging from 95 to 150 ppb, such as 90 ppb; (5) Br (Bromine), F (Fluorine), Au (Gold), In (Indium), Pr (Praseodymium), Tb (Terbium), Tm (Thulium) ranging from 400 to 1,000 ppb, such as 850 ppb; and (6) Nb (Niobium), Sc (Scandium), Si (Silicon), S (Sulfur), Y (Yttrium) ranging from 2,000 to 3,700 ppb, such as 3,200 ppb.

The exotic micronutrient component may be prepared using any convenient protocol. As such, desired amounts of individual exotic micronutrients may be combined to produce the exotic micronutrient component.

Alternatively, at least some if not all of the micronutrients may be obtained from a naturally occurring source of nutrients, e.g., fulvic acid. In certain embodiments, fulvic acid is itself the exotic micronutrient source. In such embodiments, fulvic acid is used in greater amounts than when it is employed as a complexing agent (e.g., as described in U.S. Pat. No. 6,874,277), where this greater amount may be 3-fold or more greater, such as 5-fold or more greater. Additional sources of the exotic micronutrient component include, but are not limited to: quarry from Gold (Au) and Copper (Cu) mines; Leonardite; Volcanic Hot Spring Water (Gilroy Hot Springs, Prizmatic Hot Springs—Yellowstone); Ironite Granule (Scottsdale, Ariz.); and the like.

Ionophore Component

Also present in embodiments of the compositions is an ionophore. Ionophores are any of a class of organic compounds that are capable of transporting ions across lipid barriers in a plant cell. Cations such as the species of exotic micronutrients covered in the previous section under "Exotic Micronutrient Component", can join into a multi-complexed unit shielded from repelling water molecules and find easier passage through the membranes by complexing with ionophores. Examples ionophores of interest include antibiotics, such as Gramicidin A and Valinomycin, and Amino Butyric Acids (ABA), such as D-alpha ABA, DL-alpha ABA, L-alpha ABA, DL-Beta ABA, Gama-ABA (GABA) (e.g., 4-GABA), and the like. Of interest are concentrations ranging from 50 ppm to 500 ppm, such as 200 ppm.

Water

As the subject compositions are aqueous compositions, they further include a substantial amount of water. The amount of water present in the composition may vary depending on whether the composition is a concentrated or dilute composition. Generally, the compositions include at least about 5%, usually at least about 20% and more usually at least about 30% water, where the amount of water present in the composition may be as high as 80% or higher, but generally does not exceed about 70% and usually does not exceed about 40%.

Methods of Making the Compositions

The compositions are prepared by combining water with the various agents under conditions sufficient to produce an aqueous solution containing the various agents. The water that is used to produce the subject compositions may be tap water obtained from any convenient water source, e.g. a municipal water district, where the water may be purified or otherwise treated, e.g. to remove certain undesirable agents that may be initially present therein. The various agents to be solubilized in the water to produce the soil amendment compositions may be obtained from any convenient source, e.g. commercial vendor. For example, the carbohydrate component may be derived from a commercially available carbohydrate source, such as commercially available molasses, etc.

In preparing the subject compositions, a concentrated or parent composition may first be produced, which parent composition or mix may or may not be diluted with water.

Methods of Use

The subject aqueous compositions find use in a variety of applications, including soil amendment applications, i.e., methods of improving soil, and foliar nutrient applications.

Where one starts with a parent mix or concentrate, as described above, the subject methods may include a dilution step, in which water is combined with the concentrate in order to reduce the amount of agent in the composition. This dilution step may include introducing a sufficient amount of water to the concentrate to obtain at least about a 5 fold dilution, usually at least about a 10 fold dilution, and in many instances at least about a 20 fold dilution.

For soil amendment applications, in practicing the subject methods, the aqueous composition is contacted with the soil under conditions sufficient to achieve the desired concentrations of the agents of the composition in the soil. By contact is meant that the composition is introduced into the soil such that the desired concentration of the disparate components of the composition is obtained in the soil. As such, contact can include spraying so that the composition soaks into the soil, injecting the composition into the soil, flooding the soil with the composition, and the like. Contacting results in a concentration of the CSE component in the soil that is at least about 5 ppm, usually at least about 20 ppm and more usually at least about 60 ppm, where contact may result in a concentration of the CSE component that is 650 ppm or higher, but generally does not exceed about 200 ppm and usually does not exceed about 60 ppm. In addition, contact of the composition with the soil results in a vitamin-cofactor concentration in the soil that is at least about 0.01 ppm, usually at least about 0.05 ppm and more usually at least about 1.0 ppm, where the vitamin-cofactor concentration may be as high as 10 ppm or higher, but generally does not exceed about 5.0 ppm and usually does not exceed about 1.0 ppm.

The amount of aqueous composition that is used during any one application will vary depending on the nature of the soil, the nature of the composition, the environmental conditions, etc. Where crops are treated with the subject compositions, the amount that is applied based on treated acreage is generally at least about 5 to 240 gal per acre, usually at least about 10 to 120 gal per acre, and more usually at least about 20 to 60 gal per acre, where the amount that is applied may be as high as 480 gal per acre or higher, but will usually not exceed about 240 gal per acre.

Depending on the nature of the soil, the nature of the composition, and the environmental conditions, as well as other factors, the composition may be applied more than once over a given period of time. As such, the composition may be applied daily, weekly, every two weeks, monthly etc.

Also of interest are foliar nutrient applications. In such applications, the foliar nutrient composition is contacted with at least a portion of the foliage of the plant for which growth is to be enhanced. By contact is meant that the aqueous fertilizer composition is placed on the surface of the foliage of the plant(s) to be treated, where the term "foliage" is used broadly to encompass not only the leaves of the plant, but every other part of the plant that is not underground, i.e. below the soil surface, such that the term "foliage" includes leaves, stems, flowers, fruit, etc. Contact may be by any convenient methods, including spraying, applying etc.

The amount of aqueous composition that is used during any one application will vary greatly depending on the nature of the plant, the nature of the composition, the environmental conditions, etc. Where crops are treated with the subject compositions, the amount that is applied based on acreage is generally at least about 0.25 to 10 gal per acre, usually at least about 0.25 to 5 gal per acre, and more usually at least about 0.25 to 2.5 gal per acre, where the amount that is applied may be as high as 10 gal per acre or higher, but will usually not exceed about 5 gal per acre.

Depending on the nature of the plant, the nature of the composition, and the environmental conditions, as well as other factors, the foliar fertilizer composition may be applied more than once over a given period of time. As such, the fertilizer composition may be applied daily, weekly, every two weeks, monthly etc.

Utility

The aqueous compositions of the subject invention find use in a variety of different applications, where such applications include: the control of soil borne pests and pathogens; the improvement of water filtration; the improvement in mineral release; the enhancement in the water holding capacity of soil; the mellowing of soil textural qualities; the enhancement of the decomposition of plant tissues and accelerated degradation of potentially toxic chemicals and/or allelopathic chemicals; the improvement of root mass in plants grown in treated soil; and the like.

A variety of different soil borne pests may be controlled with the subject compositions. Such pests include: plant parasitic nematodes, phylloxera, grubs, and the like. By controlled is meant that the pest population in the soil is reduced, generally by at least about 5%, usually at least about 25% and more usually at least about 50%. As such, the invention provides methods and compositions for at least reducing, if not substantially eliminating, the population of soil borne pests in soil.

Similarly, the subject methods and compositions provide means for reducing the amount of pathogen present in soil. Pathogens that can be targeted with the subject methods include: pathogenic fungi, actinomycetes, bacteria, viruses, and the like. The subject methods result in a reduction of at least about 5%, usually at least about 25%, and more usually at least about 50% of the amount of pathogen in the soil.

Also provided by the subject invention are methods and compositions for increasing indigenous soil microbe populations. Beneficial microbes whose population may be increased by the subject invention include: bacteria, fungi, actinomycetes, various free-living invertebrates, and the like. Applying the composition to the soil according to the subject methods results in at least a 2-fold increase, usually at least about a 20-fold increase and more usually at least about 40-fold increase in the microbe population in the treated soil.

The subject methods and compositions can also be used to improve water filtration through the soil. Water filtration may be improved by at least about 1.5×, usually at least about 2.5× and more usually at least about 4.5×.

Soil mineral release can also be enhanced using the subject methods and compositions. Mineral release, e.g. the release of minerals such as calcium, potassium and phosphorous, can be improved by at least about 1.5×, usually at least about 3.0× and more usually at least about 5.0× as compared to that observed in control soil.

The subject methods and compositions can be used to increase the root mass of plants grown in the treated soil. Generally, the subject methods result in an increase in root mass of at least about 1.5×, usually at least about 2.0× and more usually at least about 4.0× as compared to control plants, i.e. plants grown in untreated but otherwise substantially identical soil.

The subject methods, i.e., foliar application of the aqueous composition, may result in an enhancement of growth of the plant that is treated, as compared to a control. By enhancement of growth is meant that over a set period of time, the treated plant attains a higher total mass than the control. The amount of enhancement will typically be at least about 5%, usually at least about 10% and more usually at least about 25%, where in many embodiments the amount of enhancement may be 50% or greater. In many embodiments, the amount of enhancement will be at least about 100%.

Embodiments of the method result in enhancement of crop yield, e.g., by 5-fold or more, 10-fold or more, 15-fold or more, 20-fold or more, etc, where the amount of enhancement may be 25% or greater, e.g., 50% or greater.

A variety of different plants may be treated according to the subject methods, where such plants include both crop and ornamental plants.

All of the above figures are based on comparisons to a suitable control, e.g., the formulation without the exotic micronutrient component and the ionophore component The following experiments are offered by way of illustration and not by way of limitation.

EXPERIMENTAL

I. Activity of Egg Albumin in the Presence and Absence of Exoctic Micronutrients A simple experiment was conducted to determine the effect of exotic micronutrients on the activity of egg albumin under various conditions. Egg albumin was utilized as the liquid phase or functional state of an enzyme. Another sample of egg albumin was infused with an overnight exposure to and exotic micronutrient composition made up of approximately 52 exotic micronutrients (EM) as reported above. The untreated albumin was then gradually lowered into boiling water, which upon contact immediately denatured the protein, as would occur in plant enzymes devoid of EM stabilization. The EM Infused albumin remained stable and uncooked for between 7-10 minutes following exposure to boiling water.

The above results explain the deleterious effects of heat waves on plants with Carbon-3 Physiology whereby hot weather engages "Photorespiration", reducing Photosynthetic Efficiency (PnEf), thereafter manifesting a long list of possible compromised plant responses, including alternate bearing, low yields & quality, predisposition to pathogenic challenges, etc. Indeed, crops that are grown on productive, virgin quality soils respond positively to various agronomic practices.

II. Soil Amendment and Foliar Compositions Enhanced by Inclusion of Exotic Micronutrients Foliar Formulation with
With 2.2% Ca, 0.75% Mg, 0.12% Zn, 0.06% Mn, 0.06% Fe and 0.05% B

| Materials | 250 gal | 500 gal | 1,000 gal | Lab Batch 500 mL |
|---|---|---|---|---|
| Cane Molasses | 170 gal | 340 gal | 680 gal | 340 mL |
| Fulvic Acid (2%) | 8 gal | 16 gal | 32 gal | 16 mL |
| Exotic Mineral Mix (EM) | 10 lb | 20 lb | 40 lb | 3 g |
| Vitamin Mix | 2.5 lb | 5 lb | 10 lb | 750 mg |
| 4-GABA | 8.8 oz | 17.6 oz | 1 kg | 0.2 g |
| Citric Acid | 12.5 lb | 25 lb | 50 lb | 3.3 g |

Foliar Formulation with
With 2.2% Ca, 0.75% Mg, 0.12% Zn, 0.06% Mn, 0.06% Fe and 0.05% B

| Materials | 250 gal | 500 gal | 1,000 gal | Lab Batch 500 mL |
|---|---|---|---|---|
| Integrity Ca | 60 gal | 120 gal | 240 gal | 120 mL |
| Integrity Z422 | 8 gal | 16 gal | 32 gal | 16 mL |
| Mg Cl$_2$ Hexahydrate | 75 lb | 150 lb | 300 lb | 19 g |
| Mg NO$_3$ Hexahydrate | 100 lb | 200 lb | 400 lb | 25 g |
| Potassium Nitrate | 130 lb | 260 lb | 520 lb | 32 g |
| Boric Acid | 10 lb | 20 lb | 40 lb | 3 g |
| Propionic Acid | 3 gal | 6 gal | 12 gal | 6 mL |

The following protocol is employed to prepare the product. Prepare a premix of Exotic Micronutrient Component (EM), as reported above. Fill a cone-bottom tank with 32 gal Fulvic Acid and 12 gal Propionic Acid. Place 40 lbs of EMM in a painter's sock filter and allow this to agitate within the solution for ~16 hrs. Next, place the EM premix into the mix tank and dissolve 50 lbs of Citric Acid. Next, blend in 680 gal of Cane Molasses. Next, blend in and dissolve 10 lbs of Vitamin Mix. Next, Blend in and dissolve 1 kg of 4-GABA. Under agitation, stir in 240 gal of Integrity™ Ca (Fusion 360, Turlock Calif.). Add 32 gal Integrity™ Z422 (Fusion 360, Turlock Calif.). Gradually add Mg Chloride and dissolve this completely. Gradually add Mg Nitrate last and dissolve this completely. Gradually add 520 lbs KNO$_3$ and dissolve completely. Add 40 lbs Boric Acid and dissolve completely. If needed, adjust the volume of the mix to 1000 gal with water and blend evenly. Filter through a 400-500 mesh bag filtration unit before storing in totes.

The activity of the above formulation is compared with the activity of the above formulation without the EM component and 4-GABA (Ionophore component). Both foliar and the soil formulations provide between 9% to over 25% increases in yield and quality factors. The subject compositions are observed to reduce or eliminate alternate bearing, to protect from heat waves or freezing, to increase crop yield and/or improved quality of yield, e.g., in terms of taste, texture, nutritional content, etc.

III. Foliar Spray EM Formulation

A. Formulation

| Constituent Class | Materials | 250 gal | 2500 gal | Effective Range |
|---|---|---|---|---|
| | Warm Water | 40 gal | 400 gal | 5.0-50.0% |
| Carbon Skeleton Energy Component | 79 Brix Molasses | 14 gal | 140 gal | 5.0-65.0% |
| Macronutrient | Phos Acid 75% White | 5 gal | 44 gal | 0.7-10% |
| Micronutrient | FeSO$_4$—7H$_2$O | 10 lbs | 100 lbs | 2.0-12.0% |
| Micronutrient | MnSO$_4$—H$_2$O | 11 lbs | 100 lbs | 2.0-12.0% |
| Micronutrient | CoSO$_4$—7H$_2$O | 0.75 lbs | 7.5 lbs | 0.25-6.0% |
| Macronutrient | KH$_2$PO$_4$ | 25 lbs | 250 lbs | 0.25-20.0% |
| Macronutrient | MgSO$_4$—7H$_2$O | 68 lbs | 650 lbs | 0.25-20.0% |
| Micronutrient | Na$_2$MoO$_4$—2H$_2$O | 1 oz | 10 oz | 0.01-0.20% |
| Micronutrient | CuSO$_4$—5H$_2$O | 2 lbs | 20 lbs | 0.25-25.0% |
| Micronutrient | ZnSO$_4$—H$_2$O | 9 lbs | 90 lbs | 0.25-20.0% |
| Micronutrient | Boric Acid | 2 lbs | 22.5 lbs | 0.10-1.0% |
| Carbon Skeleton Energy Component | Citric Acid | 4 lbs | 35 lbs | 1.5-15.0% |
| Macronutrient | Urea | 35 lbs | 350 lbs | 0.01-18.0% |
| Carbon Skeleton Energy Component | Ca Lignosulfonate | 3 gal | 25 gal | 0.05-70.0% |
| Macronutrient | Phos Acid 75% White | 5 gal | 44 gal | 1.0-15.0% |

-continued

A. Formulation

| Constituent Class | Materials | 250 gal | 2500 gal | Effective Range |
|---|---|---|---|---|
| Enhancement Agent | Propionic Acid | 3 gal | 8 gal | 1.0-5.0% |
| Macronutrient | KNO$_3$ | 90 lbs | 900 lbs | 0.01-18.0% |
| Carbon Skeleton Energy Component | 79 Brix Molasses | 159 gal | 1,586 gal | 5.0-70.0% |
| Vitamin Cofactor | New Vitamin Premix or Folic Acid & B6 | 13 lbs/3 lbs each | 80 lbs/25 lbs each | 0.1-20.0% |
| Macronutrient Ionophore | Ca(NO$_3$)$_2$—4H$_2$O | 100 lbs | 1,150 lbs | 0.1-25.0% |
| | 4-Gama Amino Butyric Acid (4-GABA) | 1.5 lbs | 15 lbs | 0.4-4.0% |
| Exotic Micronutrient | Fulvic Acid | 13 gal | 125 gal | 1.0-15.0% |

Directions on Mixing 2,500 gal
1. In the large 2,500 gal mix tank place the following:
   Water 400 gal and begin warming jacket and operating paddles
   Blend in 140 gal Hi Brix Cane Molasses and dissolve completely
   Carefully add 44 gal Phosphoric Acid 75% White
   While agitating gradually blend in and dissolve completely:
   a. 100 lbs-Ferrous Sulfate Heptahydrate
   b. 100 lbs-Manganese Sulfate Monohydrate
   c. 7.5 lbs-Cobaltous Sulfate Heptahydrate
   d. 250 lbs-Mono Potassium Phosphate
   e. 650 lbs-Magnesium Sulfate Heptahydrate
   f. 10 oz-Sodium Molybdate Dihydrate
   g. 20 lbs-Copper Sulfate Pentahydrate
   h. 90 lbs-Zinc Sulfate Monohydrate
   i. 22.5 lbs-oric Acid (100%)
   j. 35 lbs-Citric Acid (100%)
   k. 350 lbs-Urea (50%)
   l. 25 gal-Ca Lignosulfonate (50%)
2. Gradually blend in and dissolve completely:
   8 gal Propionic Acid
   Begin to recirculate using the "Hydraulic Agitation" and start adding—
   a. 900 lbs-Potassium Nitrate
   b. 1,586 gal-Hi Brix Cane Molasses
   c. 80 lbs-New Vitamin Premix or 25 lbs each of Folic Acid & Pyridoxine HCl (B-6)
   d. 1,150 lbs-Calcium Nitrate Tetrahydrate
   e. 15.0 lbs-4-GABA
   f. 125 gal-Fulvic Acid (Contains ~52 exotic minerals)
   Bring the volume of up to 2,500 gal w/molasses Note:
   To make this procedure more amenable, 1$^{st}$ make up the premix batches in No. 1 above
   This premix will be about 600 gallons of material blended with the balance of materials in No. 2 to make 2,500 gallons total B. Assays for Activity In the following assays, the activity of the above formulation vs. formulation without the EM and 4-GABA components was compared.

Leaf Assay
   1. 5% and 50% Bloom Spray:

| Materials | Rate/100 gal | Comments |
|---|---|---|
| Foliar Formulation | 3 gal | Apply as a "Fine Mist" at about 50 gallons per acre. Keep speeds between 1.8-2.2 miles per hour. |
| Integrity Z422 | 1 qt | |
| Integrity Ca | 3 qt | |
| Si-100 | 4 oz | |
| Rovral FL | 1 qt | |
| Topsin WP | 1 lb | |
| 10% Boron | 6 oz | |

2. Repeat in 5-7 days with same program
3. For petal fall:

| Materials | Rate/100 gal | Comments |
|---|---|---|
| Foliar formulation | 3 gal | Fill the spray tank 1$^{st}$ with water to about 75% capacity and start agitation. Gradually blend nutrients into the mix. Apply at a volume that delivers a "Fine Mist". |
| Integrity Z422 | 1 qt | |
| Integrity Ca | 3 qt | |
| Captec 4F | 1 qt | |
| 10% Boron | 6 oz | |
| K-Nite | 2 lb | |
| Si-100 | 3 oz | |

4. Spray throughout the season at least once every 3-4 weeks. If stressful weather is anticipated, spray ahead of and/or during the stress period.

Results:

| | Critical Leaf Density | | | | | |
|---|---|---|---|---|---|---|
| Treatment | 1 | 2 | 3 | 4 | 5 | Average |
| Control | 0.035 | 0.034 | 0.032 | 0.034 | 0.035 | 0.034 (a) |
| Formulation without EM | 0.041 | 0.040 | 0.045 | 0.046 | 0.047 | 0.044 (b) |
| EM formulation | 0.055 | 0.052 | 0.054 | 0.058 | 0.058 | 0.053 (c) |

Note:
A hole-punch was used to secure discs from mature leaves. Weights are the wet weight of 10 discs.

The above results demonstrate use of an EM formulation as compared to a control results in significant enhancement in leaf density.

| Criteria 1: Average Number of Leaves Per Nut | | | | | | |
|---|---|---|---|---|---|---|
| Treatment | 1 | 2 | 3 | 4 | 5 | Average |
| Control | 7 | 7 | 6 | 5 | 6 | 6.2 (a) |
| Formulation without EM | 25 | 21 | 21 | 19 | 18 | 21.0 (b) |
| EM formulation | 28 | 27 | 36 | 33 | 27 | 30.2 (c) |

Note:
Means not followed with a similar letter are significantly different at the 95% confidence level.

The above results demonstrate use of an EM formulation as compared to a control results in significant enhancement in Average Leaves per nut.

Photosynthetic Efficiency Assay

Greenhouse tests were conducted to define and characterize the anticipated rise in Photosynthetic Efficiency (PnEf). As a result, a field test was designed to examine the efficiency of the foliar materials.

Methods

Randomized Complete Block design with 5 contiguous Nonpareil trees representing one replication. The planting is ⅓ Carmel, ⅓ Monterey, and ⅓ Nonpareil. The opportunity for "overspray" onto the next row of Nonpareil is highly unlikely and the rows will be staggered as shown below.

Summary of Test Layout
1. Randomized Complete Block Design (RCBD)
2. 5 contiguous trees will serve as a unit of replication
3. Replications=4
4. Treatments=a) control b) non EM formula c) EM formula
5. Sprays were initiated at about 5% bloom

| a) 5% Bloom | | |
|---|---|---|
| Materials | Rate/100 gal | Comments |
| Foliar Composition | 4 gal | Apply at a volume of 50 |
| Integrity Ca | 3 qt | gallons per acre. Repeat |
| Integrity Z422 | 1 pt | again at 50% bloom. |
| Rovral FL | 1 qt | |
| Topsin WP | ½ lb | |
| 10% Boron | 6 oz | |
| Si-100 | 3 oz | |

| b) 50% Bloom | | |
|---|---|---|
| Materials | Rate/100 gal | Comments |
| Foliar Composition | 4 gal | Apply at a volume of 50 |
| Integrity Ca | 3 qt | gallons per acre. Repeat |
| Integrity Z422 | 1 pt | again at 50% bloom. |
| Rovral FL | 1 qt | |
| Topsin WP | ½ lb | |
| 10% Boron | 6 oz | |
| Si-100 | always | |

| c) Petal Fall | | |
|---|---|---|
| Materials | Rate/100 gal | Comments |
| Foliar Composition | 3 gal | Apply at a volume of 50 |
| Integrity Ca | 3 qt | gallons per acre. Repeat |
| Integrity Z422 | 1 qt | again at 50% bloom. |
| Captec 4L | 1 qt | |
| 10% Boron | 6 oz | |
| Si-100 | 3 oz | |

| d) Season Long | | |
|---|---|---|
| Materials | Rate/100 gal | Comments |
| Foliar Composition | 3 gal | Apply at a volume of 50 |
| Integrity Ca | 3 qt | gallons per acre. Repeat |
| Integrity Z422 | 1 qt | again at 50% bloom. |
| 10% Boron | 6 oz | |
| K-Nite | 3 lb | |
| Si-100 | 3 oz | |

Note:
The control spray omits the foliar composition. The test treatment replaces foliar composition without EM with the EM foliar composition, as described above.

e) Sprayed 1 time per month through August.

f) Harvest in first two weeks of September.

Results

| Treatment | 1 | 2 | 3 | 4 | Average |
|---|---|---|---|---|---|
| Control | 2,400 | 2,420 | 2,510 | 2,440 | 2,433 (a) |
| Foliar composition without EM | 3,340 | 3,420 | 3,510 | 3,590 | 3,465 (b) |
| EM formulation | 4,200 | 4,510 | 4,440 | 4,,650 | 4,450 (c) |

Note:
Means not followed by a common letter are significantly different from the other means listed.

Number of Almond Meats Needed To Make Up 1 lb.

| Treatment | Nuts/lb | Average Weight/Kernal |
|---|---|---|
| Control | 260 | 1.75 gr (a) |
| Foliar composition without EM | 231 | 1.97 gr (b) |
| EM formulation | 205 | 2.21 gr (c) |

The above results demonstrate use of an EM formulation as compared to a control results in significant improvement in the quality of the crop, e.g., in terms of weight of almond.

IV. EM Formulation

| Material Type | Material | Rate/ 100 lb Batch | Comments | Range |
|---|---|---|---|---|
| Carbon Skeleton Energy | Corn Starch Sugar | 58 lbs | Gradually place the ingredients into a concrete mixer. Begin adding all other materials. | 18-78% w/w |
| Carbon Skeleton Energy | Powdered Sugar Fines | 19 lbs | | 18-78% w/w |
| Macro + Carbon Skeleton Energy | Calcium Gluconate (Fine Powder) | 17 lbs | Keep in air-tight vacuum sealed containers. | 10-20% |
| Vitamin Cofactor | Vitamin Mix | 3 lbs | | 0.1-20% |
| Ionophore | 4-GABA | 2 lbs | | 1-5 lbs Fine Powder |
| Exotic Micronutrient | Fulvic Acid Powder | 1 lbs | | 0.25-2.0 lbs |

Field studies to determine superiority of above EM formulation as compared to that of the same formulation lacking the exotic micronutrient and the ionophore (non-EM formulation), as well as a control.

Test for Superiority

Almond branches of 8th leaf Nonpareil Almonds dusted during 1st 24 hours following blossom pollination period. 4' of branch starting with terminus and basipetally.

| | Replications | | | | | |
|---|---|---|---|---|---|---|
| | 1 | 2 | 3 | 4 | 5 | $\bar{x}$ |
| Control | 173 | 166 | 170 | 159 | 158 | 165a |
| Non-EM | 205 | 198 | 207 | 210 | 199 | 204b |
| EM | 221 | 240 | 235 | 242 | 238 | 235c |

Means not followed by a common letter are significantly different at the 95% confidence interval.

Test for Attraction to Honey Bees:

Gauged by "Visitations" to an open dish to honey bees at 2 conditions (55° F. and 65° F.). Open dish placed 1' in front of the hive opening. Exposure period of 20 minutes~

| | Replications | | | | | |
|---|---|---|---|---|---|---|
| | 1 | 2 | 3 | 4 | 5 | $\bar{x}$ |
| (55° F.) | | | | | | |
| Check | 8 | 10 | 7 | 6 | 3 | 7a |
| Non-EM | 43 | 40 | 43 | 49 | 49 | 45b |
| EM | 55 | 58 | 61 | 67 | 65 | 61c |
| (65° F.) | | | | | | |
| Check | 18 | 21 | 24 | 17 | 19 | 20A |
| non-EM | 110 | 118 | 126 | 130 | 138 | 124B |
| EM | 149 | 148 | 186 | 167 | 168 | 158C |

V.

| Ingredient Category | Materials | "Volume per 2,500 gal Mix" | Final Concentration (v/v) | Concentration Range |
|---|---|---|---|---|
| Carbon Skeleton Energy Component | 79 Brix Molasses | 875 gal | 35.0% | 10-45% |
| Carbon Skeleton Energy Component | Lignosulfonate Ammonium | 949 gal | 38.0% | 10-45% |
| Enhancement Agent | Propionic Acid | 50 gal | 2.0% | 1-5% |
| Enhancement Agent & Exotic Micronutrient | Fulvic Acid* | 100 gal | 4.0% | 1-10% |
| Carbon Skeleton Energy Component, Exotic Micronutrient, & Ionophore | Corn Steep Liquor** | 350 gal | 14.0% | 7-20% |
| Vitamin Cofactor | Brewer's Yeast | 63 lbs | 2.5% | 1-5% |
| Macronutrient | Potassium Chloride | 75 lbs | 3.0% | 1.5-6% |
| Macronutrient | Potassium Nitrate | 75 lbs | 3.0% | 1.5-6% |
| Ionophore | 4-GABA | 15 lbs | 0.4% | 0.4-4% |

Directions:
1. Into a mix tank place 50 gal Propionic Acid and 100 gal Fulvic Acid and start agitation.
2. Gradually pour 75 lbs KCl and 75 lbs KNO3 and dissolve.
3. Blend in 949 gal lignosulfonate and 350 gal corn steep.
4. Blend in 875 gal of Cane Molasses.
5. Continue agitation until all the KCl & KNO3 dissolves.
6. Bring the volume up to 2,500 gal with water.
7. Continue agitation and periodically run past a filter w/ 60-100 mesh screen.

Note:
*Fulvic Acid is a natural source of ~52 exotic minerals. (See Categories of Exotic Minerals)
**Corn Steep Liquor is a natural source of low levels of 4-GABA.

VI. Honey Bee Supplement Formulation:

| Class Constituent | Ingredients | "Volume per 2,500 gal Mix" | Concentration Range |
|---|---|---|---|
| Carbon Skeleton Energy Component | High Brix Cane Molasses | 1,200 gal | 20-60% |

-continued

| Class Constituent | Ingredients | "Volume per 2,500 gal Mix" | Concentration Range |
|---|---|---|---|
| Carbon Skeleton Energy Component | Corn Syrup | 1,000 gal | 20-50% |
| Exotic Micronutrient | Fulvic Acid | 125 gal | 2-6% |
|  | Tap Water | 50 gal | 1-5% |
| Enhancement Agent | Propionic Acid | 50 gal | 0.5-4% |
| Vitamin Cofactor | Vitamin Mix | 25 lbs | 0.25-3% |
| Ionophore | 4-GABA | 2.5 lbs | 0-0.4% |
| Macronutrient | Protein | 75 gal | 0.5-6% |
| Artificial Fragrance | Jasmine or Lilac | 1 gal | 0.01-6% |

Mixing instructions for a 2,500 gal batch:
8. Into a mix vat place 50 gal Tap Water + 50 gal Propionic Acid + 125 gal Fulvic Acid + Weight Lifter's Protein Drink and begin agitation.
9. Gradually and dissolve 4-GABA + Vitamin Mix.
10. Gradually blend in High Brix Molasses + Corn Syrup.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. An aqueous composition comprising a carbon skeleton energy component; a macronutrient component; a vitamin cofactor component; a complexing agent; an exotic micronutrient component and an ionophore component.

2. The composition according to claim 1, wherein said exotic micronutrient component is present in an amount ranging from 1 to 15% w/w.

3. The composition according to claim 2, wherein said exotic micronutrient component includes source of ionic species of at least 10 different elements of the following list of elements: Aluminum (Al), Antimony (Sb), Barium (Ba), Beryllium (Be), Bismuth (Bi), Boron (B), Bromine (Br), Cadmium (Cd), Cerium (Ce), Cesium (Cs), Chromium (Cr), Cobalt (Co), Dysprosium (Dy), Erbium (Er), Europium (Eu), Fluorine (F), Gadolinium (Gd), Gallium (Ga), Germanium (Ge), Gold (Au), Hafnium(Hf), Holmium (Ho), Indium (In), Lanthanum (La), Lutetium (Lu), Lithium (Li), Mercury (Hg), Molybdenum (Mo), Neodymium(Nd), Nickel (Ni), Niobium (Nb), Platinum (Pt), Praseodymium (Pr), Rhodium (Rh), Ruthenium (Ru), Samarium (Sm), Scandium (Sc), Selenium (Se), Silicon (Si), Silver (Ag), Strontium (Sr), Sulfur (S), Tellurium (Te), Terbium (Tb), Thallium (Tl), Thorium (Th), Thulium (Tm), Tin (Sn), Titanium (Ti), Tungsten (W), Vanadium (V), Ytterbium (Yb), Yttrium (Y), and Zirconium (Zr).

4. The composition according to claim 1, wherein said exotic micronutrient component is fulvic acid.

5. The composition according to claim 1, wherein said ionophore component is present in said composition in an amount ranging from 50 to 500 ppm.

6. The composition according to claim 1, wherein said ionophore is an antibiotic or an amino butyric acid.

7. The composition according to claim 6, wherein said amino butyric acid is 4-GABA.

8. The composition according to claim 1, wherein said carbon skeleton energy component is present in an amount ranging from 5 to 75% w/w.

9. The composition according to claim 1, wherein said macronutrient component is present in an amount ranging from 0.01 to 25% w/w.

10. The composition according to claim 1, wherein said micronutrient is present in an amount ranging from 0.001 to 25% w/w.

11. The composition according to claim 1, wherein said vitamin cofactor component is present in an amount ranging from 0.001 to 10% w/w.

12. The composition according to claim 3, wherein each element of said list of elements is independently present or absent and:
    when present the elements Cadmium (Cd), Cesium (Cs) and Mercury (Hg) are independently present at a concentration ranging from 1 to 10 ppb in the composition;
    when present the elements Selenium (Se), Aluminum (Al), Barium (Ba), Beryllium (Be), Boron (B), Chromium (Cr), Dysprosium (Dy), Gallium (Ga), Lanthanum (La), Nickel (Ni), Ruthenium (Ru), Strontium (Sr), Tellurium (Te), Tin (Sn), and Vanadium (V) are independently present at concentrations ranging from 10 to 25 ppb in the composition;
    when present the elements Molybdenum (Mo), Antimony (Sb), Cerium (Ce), Cobalt (Co), Erbium (Er), Gadolinium (Gd), Germanium (Ge), Hafnium(Hf), Lutetium (Lu), Lithium (Li), Rhodium (Rh), Samarium (Sm), Titanium (Ti), Tungsten (W), Ytterbium (Yb) and Zirconium (Zr) are independently present at a concentration ranging from 20 to 40 ppb in the composition;
    when present the elements Bismuth (Bi), Europium (Eu), Holmium (Ho), Neodymium (Nd), Platinum (Pt), Silver (Ag), Thallium (Tl) and Thorium (Th) are independently present at a concentration ranging from 95 to 150 ppb in the composition;
    when present the elements Bromine (Br), Fluorine (F), Gold (Au), Indium (In), Praseodymium (Pr), Terbium (Tb) and Thulium (Tm) are independently present at a concentration ranging from 400 to 1000 ppb in the composition; and
    when present the elements Niobium (Nb), Scandium (Sc), Silicon (Si), Sulfur (S) and Yttrium (Y) are independently present at a concentration ranging from 2000 to 3700 ppb in the composition.

13. A method comprising:
    (a) providing an aqueous composition comprising:
        a carbon skeleton energy component;
        a macronutrient component;
        a vitamin cofactor component;
        a complexing agent;
        an exotic micronutrient component; and
        an ionophore component; and
    (b) applying said composition to at least one member selected from the group consisting of soil and foliage.

14. The method according to claim 13, wherein said composition is applied to soil.

15. The method according to claim 14, wherein said composition is applied to foliage.

16. The method according to claim 13, wherein said composition is diluted prior to said applying.

17. An aqueous composition consisting of a carbon skeleton energy component; a macronutrient component; a vitamin cofactor component; a complexing agent; an exotic micronutrient component and an ionophore component.

18. The composition according to claim 17, wherein said ionophore component is an amino butyric acid.

19. The composition according to claim 18, wherein said amino butyric acid is 4-GABA.

20. A method comprising:
(a) providing an aqueous composition consisting of:
a carbon skeleton energy component;
a macronutrient component;
a vitamin cofactor component;
a complexing agent;
an exotic micronutrient component; and
an ionophore component; and
(b) applying said composition to at least one member selected from the group consisting of soil and foliage.

* * * * *